United States Patent
Miwa et al.

(10) Patent No.: US 8,718,235 B2
(45) Date of Patent: May 6, 2014

(54) MOBILE INFORMATION TERMINAL

(75) Inventors: Tomoaki Miwa, Osaka (JP); Tomoaki Tsukiyama, Osaka (JP); Kazuaki Nakae, Osaka (JP)

(73) Assignee: KYOCERA Corporation, Kyoto (JP)

( * ) Notice: Subject to any disclaimer, the term of this patent is extended or adjusted under 35 U.S.C. 154(b) by 1022 days.

(21) Appl. No.: 12/281,531

(22) PCT Filed: Mar. 2, 2007

(86) PCT No.: PCT/JP2007/053996
§ 371 (c)(1),
(2), (4) Date: Jan. 23, 2009

(87) PCT Pub. No.: WO2007/102414
PCT Pub. Date: Sep. 13, 2007

(65) Prior Publication Data
US 2009/0221262 A1 Sep. 3, 2009

(30) Foreign Application Priority Data

Mar. 3, 2006 (JP) ................... 2006-057137
Mar. 3, 2006 (JP) ................... 2006-057138
Mar. 3, 2006 (JP) ................... 2006-057139

(51) Int. Cl.
*H04M 11/04* (2006.01)
(52) U.S. Cl.
USPC ............... 379/40; 379/41; 379/45; 379/48; 379/51
(58) Field of Classification Search
USPC .................... 379/40, 41, 45, 48, 51
See application file for complete search history.

(56) References Cited

U.S. PATENT DOCUMENTS

| 5,673,304 A * | 9/1997 | Connor et al. ............... 379/45 |
| 5,732,125 A * | 3/1998 | Oyama ................. 455/404.1 |
| 5,953,650 A * | 9/1999 | Villevieille ............ 455/404.2 |
| 6,172,477 B1 * | 1/2001 | Kim ........................... 320/114 |
| 6,314,173 B1 * | 11/2001 | Hatamura ............ 379/215.01 |

(Continued)

FOREIGN PATENT DOCUMENTS

| JP | S62-175893 A | 8/1987 |
| JP | H04-297354 A | 10/1992 |

(Continued)

OTHER PUBLICATIONS

Notice of Ground of Rejection dated Nov. 8, 2011, in related Japanese Application No. 2010-066400.

(Continued)

*Primary Examiner* — Alexander Jamar
(74) *Attorney, Agent, or Firm* — Procopio, Cory, Hargreaves & Savitch LLP

(57) ABSTRACT

To carry out processing to be executed upon occurrence of an emergency, a mobile phone includes a power control portion for supplying driving power, a RAM capable of storing data in the state where the driving power is not supplied from the power control portion, a crime prevention switch for detecting occurrence of an emergency, and a control portion which is driven by the driving power supplied from the power control portion. The control portion stores an emergency flag in an ON state indicating an emergency mode in the RAM in response to detection of the emergency by the crime prevention switch, and carries out emergency processing. When the control portion is activated as the supply of the driving power from the power control portion is started, it carries out the emergency processing if the emergency flag in the ON state is stored in the RAM.

24 Claims, 9 Drawing Sheets

(56) References Cited

U.S. PATENT DOCUMENTS

| | | | |
|---|---|---|---|
| 6,696,956 B1 | 2/2004 | Uchida et al. | |
| 7,689,201 B2* | 3/2010 | Katsube et al. | 455/404.1 |
| 8,068,808 B2* | 11/2011 | Smith | 455/404.2 |
| 8,081,748 B2* | 12/2011 | Johns | 379/211.01 |
| 2003/0050039 A1 | 3/2003 | Baba et al. | |
| 2004/0253963 A1* | 12/2004 | Park et al. | 455/456.2 |
| 2005/0197096 A1* | 9/2005 | Yang et al. | 455/404.1 |
| 2005/0233726 A1* | 10/2005 | Katsube et al. | 455/404.1 |
| 2005/0243974 A1* | 11/2005 | Pearson | 379/37 |
| 2007/0026889 A1* | 2/2007 | Yamauchi et al. | 455/552.1 |
| 2007/0297594 A1* | 12/2007 | Barnes et al. | 379/208.01 |

FOREIGN PATENT DOCUMENTS

| | | |
|---|---|---|
| JP | 10-023545 | 1/1998 |
| JP | H10-023545 | 1/1998 |
| JP | H10-210185 A | 8/1998 |
| JP | H10-285294 A | 10/1998 |
| JP | 11-308367 | 5/1999 |
| JP | 2919388 | 7/1999 |
| JP | 11-266324 | 9/1999 |
| JP | 2000-358089 | 12/2000 |
| JP | 2001-28644 | 1/2001 |
| JP | 2001-222783 | 8/2001 |
| JP | 2001-319283 | 11/2001 |
| JP | 2001-319293 A | 11/2001 |
| JP | 2003-78632 | 3/2003 |
| JP | 2004-023709 | 1/2004 |
| JP | 2005-123882 A | 5/2005 |
| JP | 2005-184102 | 7/2005 |
| JP | 2005-197915 A | 7/2005 |
| JP | 3667087 | 7/2005 |
| JP | 2005-216128 | 8/2005 |
| JP | 2008-544627 A | 12/2008 |

OTHER PUBLICATIONS

Office Action dated Aug. 29, 2011, issued in counterpart Chinese Application No. 2007-80016076.1.
JP057139/2006, Notice of Allowance, Jan. 19, 2010.
JP057183/2006, office action, Jan. 19, 2010.
Notice of Ground of Rejection dated Jan. 25, 2011 issued by the Japanese Patent Office for counterpart Japanese Application No. JP2006-057137.
Notice of Ground of Rejection dated Jan. 25, 2011 issued by the Japanese Patent Office for counterpart Japanese Application No. JP2006-057138.
Notice of Argument Submission issued in the corresponding Korean Patent Application No. 2008-7024249 dated May 26, 2010, 16 pages.
International Search Report dated Jun. 5, 2007 for PCT/JP2007/053996.
Notice of Ground of Rejection issued in the corresponding JapanesePatent Application No. 2006-057138, dated Aug. 3, 2010, 10 pages.
Notice of Ground of Rejection dated Aug. 16, 2011, issued for counterpart Japanese Application No. 2006-057137.
Notice of Ground of Rejection dated Mar. 21, 2012, issued in counterpart Japanese Application No. 2010-224618.
Notice of Argument Submission dated Feb. 27, 2012, issued in counterpart Korean Application No. 2010-7016698.
Second Office Action dated Sep. 29, 2012, issued in counterpart Chinese Application No. 200780016076.1.
Report on Pretrial Examination attached to Questioning for Appeal Trial dated Dec. 4, 2012, issued in counterpart Japanese Application No. 2010-066400.
Report on Pretrial Examination issued in the corresponding Japanese Patent Application No. 2010-224618 dated May 28, 2013 (3 pages).
FOMA P901i Instruction Book, NTT DoCoMo, May 2005, 5thedition, p. 61, 62 (5 pages).
Notice of Ground of Rejection issued in a divisional application No. 2010-066400 of one of the corresponding Japanese applications No. 2006-057138, dated May 7, 2013.
Notice of Ground of Rejection issued in a divisional application No. 2011-227911 of one of the corresponding Japanese applications No. 2006-057137, dated Aug. 6, 2013.

* cited by examiner

F I G. 9
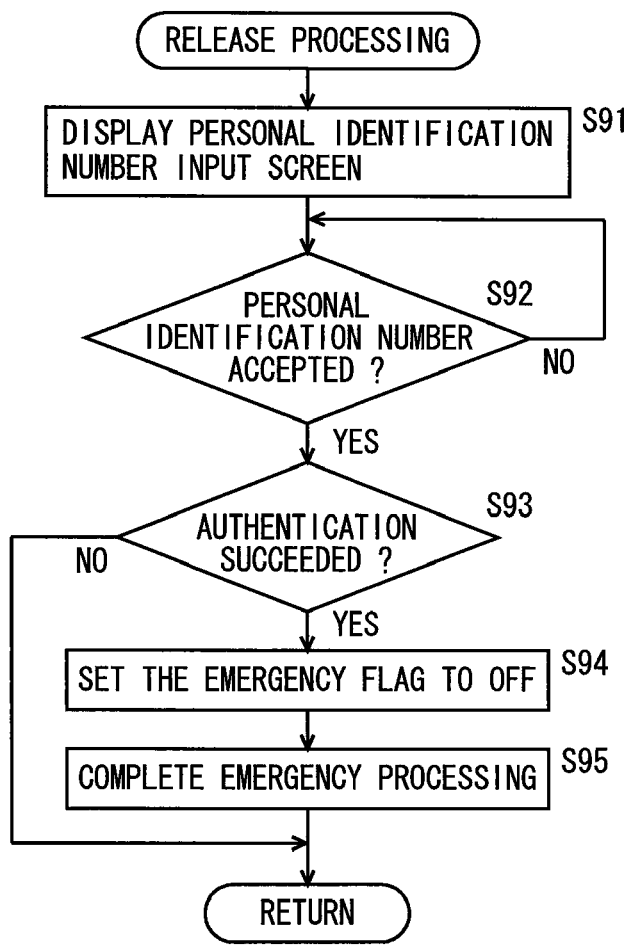

MOBILE INFORMATION TERMINAL

CROSS-REFERENCE TO RELATED APPLICATION

The present application is a U.S. national stage application of PCT Patent Application No. PCT/JP2007/053996, filed Mar. 2, 2007, entitled PORTABLE INFORMATION TERMINAL, which claims priority to Japanese Patent Application Nos. 2006-057137, 2006-057138, and 2006-057139, each of which was filed on Mar. 3, 2006. Each of the above identified applications is incorporated herein by reference in its entirety.

BACKGROUND

1. Technical Field

The present invention relates to a mobile information terminal, and more particularly, to a mobile information terminal which is driven by power supplied from a power source.

2. Background Art

Recently, there is known a mobile phone which automatically calls a predetermined telephone number in the event of an emergency. For example, Japanese Patent No. 3667087 discloses a method of controlling a portable telephone terminal provided with a radio section which communicates with a base station via a radio circuit, a speaker, and an input section, wherein when there is an input indicating an emergency to the input section, an emergency warning sound is issued from the speaker, and also a predetermined telephone number is automatically dialed a predetermined time after the input indicating the emergency, or the predetermined telephone number is automatically dialed if a calling operation is performed before the predetermined time passes from the input indicating the emergency, and the emergency warning sound is stopped once the line is connected.

A mobile phone, however, is mounted with a power source such as a battery and driven by the power supplied from the battery. Thus, it cannot be driven if the charged level of the battery is lowered or the battery is removed therefrom. Even if the mobile phone is connected to a battery charger or a battery charged with adequate power is mounted to the mobile phone afterwards, the mobile phone is reset. As such, in the mobile phone disclosed in Japanese Patent No. 3667087, after the input indicating the emergency is received, if the battery level is lowered or the battery is removed from the mobile phone before a call automatically dialed is established, it becomes no longer possible to connect the line at that point. Thereafter, even if a battery charger for charging the battery is connected to or a battery charged with adequate power is mounted to the mobile phone, in order to connect the line, the input indicating the emergency needs to be made to the mobile phone again.

Further, with the control method disclosed in Japanese Patent No. 3667087, in the event that there is an incoming call before automatic dialing, the user needs to answer the call, hindering automatic dialing while the ringing tone is produced. Further, in the event that there is an input indicating the emergency while the line is connected, automatic dialing cannot be made because the line is busy.

Furthermore, with the control method disclosed in Japanese Patent No. 3667087, when a line is connected, the emergency warning sound is stopped, in which case it is no longer possible to let the surrounding people know that the state of emergency is continuing. On the other hand, if the line is connected with the emergency warning sound not stopped, the emergency warning sound would be output in a large volume from a speaker of the telephone on the other party, thereby surprising the person on the other end.

Japanese Patent No. 2919388 discloses a radio telephone set which includes automatic calling means for transmitting/receiving call information to and from a base station connected to a public network to make a call with a subscriber in the public network, and emergency message automatic transmission means. With an emergency contact key as a combination of one or more keys provided in the radio telephone set being defined by software, when the owner of the radio telephone set depresses the emergency contact key, a prescribed emergency contact number registered in advance is dialed by the automatic calling means repeatedly for a prescribed number of times at regular intervals until the emergency contact place answers. If there is no answer even if the number of times of recalling reaches the prescribed number of times, the speaker provided in the radio telephone set is continuously rang until the owner of the telephone set performs a stop operation, whereas when the answer of the emergency contact place is detected, connection of the reception signal to the receiver of the radio telephone set is blocked, and automatic transmission of a pre-registered emergency message to the emergency contact place is repeated by the emergency message automatic transmission means until the emergency contact place performs an end-call operation, and when the end-call operation is detected, the automatic transmission of the emergency message is stopped, and connection of the reception signal to the receiver is recovered to attain a standby state.

However, because the microphone is ON during reproduction of the emergency message, for example when a crime prevention buzzer is ringing, the emergency message would be deafened by the buzzer, hindering transmission of the emergency message to the other party.

SUMMARY

The present invention has been accomplished to solve the above-described problems, and an object of the present invention is to provide a mobile information terminal which is capable of carrying out predetermined processing to the end that is supposed to be carried out upon occurrence of an emergency.

Another object of the present invention is to provide a mobile information terminal which is capable of surely notifying a user that it is ready to communicate with a telephone set of a pre-registered telephone number while a warning sound is issued.

A still further object of the present invention is to provide a mobile information terminal which is capable of generating a warning sound and also avoiding surprising a person on the other end of the line.

Yet another object of the present invention is to provide a mobile information terminal which is capable of generating a warning sound and also capable of causing a message reproduced upon an emergency to be heard in a clear voice.

Yet another object of the present invention is to provide a mobile information terminal which is capable of immediately establishing a call with a telephone set required upon an emergency when there occurs an emergency during a telephone conversation.

Other features and advantages of the present invention will become more readily apparent to those of ordinary skill in the art after reviewing the following detailed description and accompanying drawings.

BRIEF DESCRIPTION OF THE DRAWINGS

FIG. 9 is a flowchart illustrating an example of the flow of release processing.

DETAILED DESCRIPTION

Figure 1A:
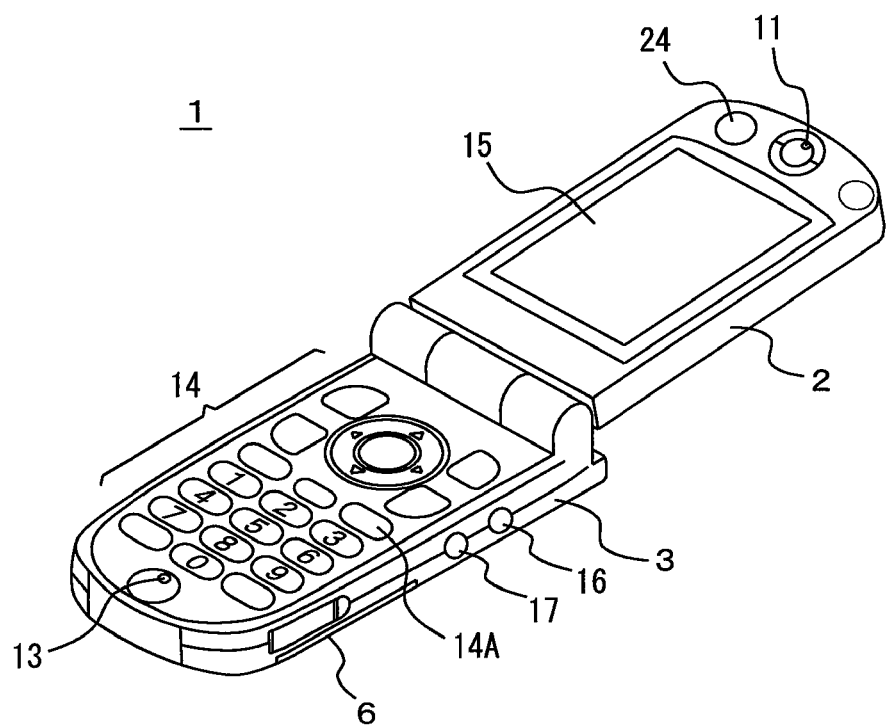
FIGS. 1A and 1B are perspective views of a mobile phone according to an embodiment of the present invention.

To achieve the above-described objects, according to an aspect of the present invention, a mobile information terminal includes: power control means for supplying driving power; storage means capable of storing data in the state where the driving power is not supplied from the power control means; detecting means for detecting occurrence of an emergency; and control means which is driven as the driving power is supplied from the power control means, wherein the control means includes: mode information storage means for storing mode information indicating an emergency mode in the storage means in response to detection of the occurrence of the emergency by the detecting means, emergency processing executing means for executing predetermined processing in response to detection of the occurrence of the emergency by the detecting means, and startup-time processing means for executing the predetermined processing when the control means is activated as the supply of the driving power from the power control means is started and in the case where the mode information indicating the emergency mode is stored in the storage means.

According to this aspect, the mode information indicating that it is in the emergency mode is stored in the storage means in response to detection of the occurrence of the emergency, and predetermined processing is carried out. When the control means is activated with the supply of driving power started, the predetermined processing is carried out if the mode information indicating that it is in the emergency mode is stored. Thus, even if the driving power is shut off in the state of emergency mode and hence the predetermined processing is interrupted, the predetermined processing can be carried out when the driving power is supplied next time. As a result, it is possible to provide the mobile information terminal which can carry out the processing to the end that is supposed to be carried out upon occurrence of an emergency.

Preferably, the power control means includes voltage detecting means for detecting a voltage of a power source, and emergency activation means for starting supply of the driving power to the control means when the detected voltage exceeds a predetermined threshold value and in the case where the mode information indicating the emergency mode is stored in the storage means.

According to this aspect, when the voltage of the power source exceeds a predetermined threshold value, in the event that the mode information indicating that it is in the emergency mode is stored in the storage means, supply of the driving power to the control means is started. This means that only connecting the power source having the voltage exceeding the predetermined threshold value can cause the predetermined processing to be carried out.

Preferably, the mobile information terminal further includes accepting means for accepting a drive instruction for instructing driving of the control means, wherein the power supply means includes normal activation means for supplying the driving power to the control means when the detected voltage exceeds a predetermined threshold value and in the case where the mode information indicating the emergency mode is not stored in the storage means, on the condition that the drive instruction is accepted by the accepting means.

According to this aspect, in the case where the mode information indicating that it is in the emergency mode is not stored, driving power is supplied to the control means on the condition that the drive instruction is accepted. When the mobile information terminal is not in the emergency mode, the control means is not driven if there is no drive instruction, which can restrict power consumption.

Preferably, the voltage detecting means detects a voltage of a removable battery.

According to this aspect, even if the charged level of the battery is lowered, the predetermined processing can be carried out when the battery is replaced with a charged one.

Preferably, the voltage detecting means detects a voltage of an external power source.

According to this aspect, the predetermined processing can be carried out when an external power source is connected.

Preferably, the control means further includes emergency mode release means for deleting the mode information indicating the emergency mode from the storage means in response to completion of the predetermined processing.

According to this aspect, the predetermined processing is prevented from being carried out a plurality of number of times repeatedly.

Preferably, the emergency processing executing means includes calling means for calling a predetermined destination.

According to this aspect, a call is made to a predetermined destination, which allows the user to notify a predetermined person of occurrence of an emergency.

Preferably, the emergency processing executing means includes position detecting means for detecting a current position, and transmission means for transmitting the detected current position.

According to this aspect, the detected current position is transmitted, which enables notification of the current position.

According to another aspect of the present invention, a mobile information terminal includes: detecting means for detecting occurrence of an emergency; storage means for storing a telephone number in advance; mode switching means for switching a mode to an emergency mode in response to detection of the occurrence of the emergency by the detecting means; incoming call detecting means for detecting an incoming call; and answering means for answering the incoming call detected by the incoming call detecting means in the emergency mode in the case where the incoming call is associated with the telephone number prestored in the storage means.

According to this aspect, the mode is switched to the emergency mode in response to detection of occurrence of an emergency, and an incoming call is answered if the detected incoming call is associated with a prestored telephone number. When there is a call from a prestored telephone number after occurrence of an emergency, the call is automatically answered to allow a telephone conversation. Accordingly, it is possible to provide the mobile information terminal which is capable of immediately establishing a call with the telephone set assigned a pre-registered telephone number in an emergency.

Preferably, the mobile information terminal further includes rejecting means for rejecting the incoming call detected by the incoming call detecting means in the emergency mode in the case where the incoming call is not associated with the telephone number prestored in the storage means.

According to this aspect, the incoming call is rejected if the detected incoming call is not associated with a prestored telephone number. This eliminates establishment of a call with an unnecessary telephone set.

Preferably, the mobile information terminal further includes: warning sound generating means for generating a warning sound in response to detection of the occurrence of the emergency by the detecting means; vibration generating means for generating vibration; and incoming-call answering notification means for activating the vibration generating means when the answering means answers in the emergency mode.

According to this aspect, a warning sound is generated in response to detection of occurrence of an emergency, and vibration is generated when answering the incoming call. Accordingly, the user can surely be notified that it is possible to talk with the telephone set assigned a pre-registered telephone number while the warning sound is heard.

Preferably, the answering means does not answer the incoming call detected by the incoming call detecting means in the case where the incoming call is not associated with the telephone number prestored in the storage means.

Preferably, the answering means does not answer the incoming call detected by the incoming call detecting means in the case where the incoming call requires a video telephone.

According to a further aspect of the present invention, a mobile information terminal includes: detecting means for detecting occurrence of an emergency; storage means for storing a telephone number in advance; warning sound generating means for generating a warning sound in response to detection of the occurrence of the emergency by the detecting means; vibration generating means for generating vibration; mode switching means for switching a mode to an emergency mode in response to detection of the occurrence of the emergency by the detecting means; interlock calling means for calling the telephone number prestored in the storage means in the emergency mode; and outgoing-call answering notification means for activating the vibration generating means in the case where an answer to the call originated by the interlock calling means is detected.

According to this aspect, a warning sound is generated in response to detection of occurrence of an emergency, and vibration is generated when a prestored telephone number is dialed and an answer to the call is detected. This can notify the user by vibration that the line is connected. As a result, it is possible to provide the mobile information terminal which can surely notify the user that the user can talk to the telephone set assigned a pre-registered telephone number while the warning sound is heard in an emergency.

Preferably, the storage means is capable of storing a plurality of telephone numbers, the interlock calling means includes selecting means for selecting the plurality of telephone numbers, and the selecting means selects a next telephone number in the case where an answer to a call originated to a previously selected telephone number is not detected within a predetermined period of time after the origination of the call.

According to this aspect, if there is no answer detected within a predetermined time after a previously selected telephone number is called, a next telephone number is selected. This enables efficient calling of a plurality of telephone numbers.

According to yet another aspect of the present invention, a mobile information terminal includes: detecting means for detecting occurrence of an emergency; storage means for storing a telephone number in advance; and disconnecting means for disconnecting a call with a device on the other end when the occurrence of the emergency is detected by the detecting means during the call and in the case where the telephone number assigned to the device on the other end is not prestored in the storage means.

According to this aspect, in the case where occurrence of an emergency is detected during a call with a device on the other end of the line, the call is disconnected if the telephone number assigned to the device on the other end is not stored in advance. Accordingly, it is possible to provide the mobile information terminal which can immediately establish a call with a telephone set required in an emergency when there occurs an emergency during a call.

Preferably, the mobile information terminal further includes: incoming call detecting means for detecting an incoming call; and answering means for answering the incoming call in the case where the incoming call detected by the incoming call detecting means in an emergency mode is associated with the telephone number prestored in the storage means.

According to this aspect, in the case where the incoming call detected in the emergency mode is associated with a prestored telephone number, the call is answered to allow a telephone conversation. This enables prompt establishment of a call with the device assigned a predetermined telephone number upon occurrence of an emergency even during a call.

Preferably, the mobile information terminal further includes: warning sound generating means for generating a warning sound in response to detection of the occurrence of the emergency by the detecting means; vibration generating means for generating vibration; and incoming-call answering notification means for activating the vibration generating means when the answering means answers in the emergency mode.

Preferably, the mobile information terminal further includes interlock calling means for calling the telephone number prestored in the storage means in response to detection of the occurrence of the emergency by the detecting means.

According to this aspect, a prestored telephone number is called in response to detection of occurrence of an emergency. This enables prompt establishment of a call with the device assigned a predetermined telephone number upon occurrence of an emergency even during a call.

Preferably, the mobile information terminal further includes: warning sound generating means for generating a warning sound in response to detection of the occurrence of the emergency by the detecting means; vibration generating means for generating vibration; and outgoing-call answering notification means for activating the vibration generating means in the case where an answer to the call originated by the interlock calling means is detected in an emergency mode.

Preferably, the storage means is capable of storing a plurality of telephone numbers, the interlock calling means includes selecting means for selecting the plurality of telephone numbers, and the selecting means selects a next telephone number in the case where an answer to a call originated to a previously selected telephone number is not detected within a predetermined period of time after the origination of the call.

According to yet another aspect of the present invention, a mobile information terminal includes: detecting means for detecting occurrence of an emergency; mode switching means for switching a mode to an emergency mode in response to detection of the occurrence of the emergency by the detecting means; warning sound generating means for generating a warning sound in response to detection of the occurrence of the emergency by the detecting means; and sensitivity lowering means for lowering sensitivity of a microphone for use in telephone conversation during at least a part of a telephone conversation in the emergency mode.

According to this aspect, a warning sound is generated in response to detection of occurrence of an emergency, and in the emergency mode, sensitivity of the microphone for use in telephone conversation is lowered during at least a part of the telephone conversation. This reduces the volume of the warning sound collected by the microphone, so that the warning sound is prevented from being output in a large volume from the device on the other end of the line. As a result, it is possible to provide the mobile information terminal which generates a warning sound and also avoids surprising the person on the other end of the line.

Preferably, the sensitivity lowering means lowers the sensitivity of the microphone while the warning sound generating means is generating the warning sound.

Preferably, the warning sound generating means includes stop means for temporarily stopping generation of the warning sound, and step-up output means for increasing a volume in a stepwise manner over time in the case where the temporary stop by the stop means is released while the telephone conversation is continued after detection of an answer to the call originated by the interlock calling means.

According to this aspect, in the case where temporary stop of the warning sound is released while the call is maintained as an answer to the outgoing call is detected, the warning sound is generated with a volume increased in a stepwise manner over time. This avoids surprising the person on the other end of the line with the warning sound abruptly heard in a large volume.

Preferably, the mobile information terminal further includes: storage means for storing a telephone number in advance; and interlock calling means for calling the telephone number prestored in the storage means in the emergency mode.

According to this aspect, a prestored telephone number is called to allow a telephone conversation when the call is answered. This enables prompt establishment of a call with the telephone set assigned a pre-registered telephone number.

Preferably, the mobile information terminal further includes reproduction means for reproducing a predetermined message in response to detection of an answer to the call originated by the interlock calling means, wherein the sensitivity lowering means includes cut-off means for cutting off an output of the microphone during the time when the reproduction means is reproducing the message.

According to this aspect, a warning sound is generated in response to detection of the occurrence of the emergency, a prestored telephone number is called, and a predetermined message is reproduced in response to detection of an answer to the call. The output of the microphone is cut off while the message is being reproduced. As such, even if the warning sound is collected by the microphone, it does not reach the party on the other end, thereby allowing the other party to hear the noiseless message. As a result, it is possible to provide the mobile information terminal which generates a warning sound and also enables a message reproduced in an emergency to be heard in a clear voice.

Preferably, the mobile information terminal further includes: storage means for storing a telephone number in advance; incoming call detecting means for detecting an incoming call; and answering means for answering the incoming call in the case where the incoming call detected in the emergency mode is associated with the telephone number prestored in the storage means.

According to this aspect, in the case where the detected incoming call is associated with a prestored telephone number, the incoming call is answered to allow a telephone conversation. Accordingly, it is possible to immediately establish a call with the telephone set assigned a pre-registered telephone number.

Embodiments of the present invention will now be described with reference to the drawings. In the following description, like reference characters denote like parts, which have like names and functions, and therefore, detailed description thereof will not be repeated. The following reference characters are used in the following description: 1: mobile phone; 2: display side portion; 3: operation side portion; 3A: housing portion; 3B: switch housing portion; 4: battery; 5: screw; 6: lid; 7: crime prevention switch; 11: first speaker; 12: second speaker; 13: microphone; 14: operation keys; 14A: power key; 16: microphone terminal; 17: earphone terminal; 19: posture detection switch; 21: control portion; 22: radio circuit; 22A: antenna; 23: GPS; 24: camera; 26: vibration portion; 27: card I/F; 27A: flash memory; 28: coder-decoder portion; 29: switching portion; 30: display control portion; 31: ROM; 32: RAM; 32A: backup power source; 34: buzzer generating circuit; 40: power supply control circuit; 41: power supply control portion; 43: external power supply terminal; 44: external power source; and 51: mode switching portion.

Figure 1B:
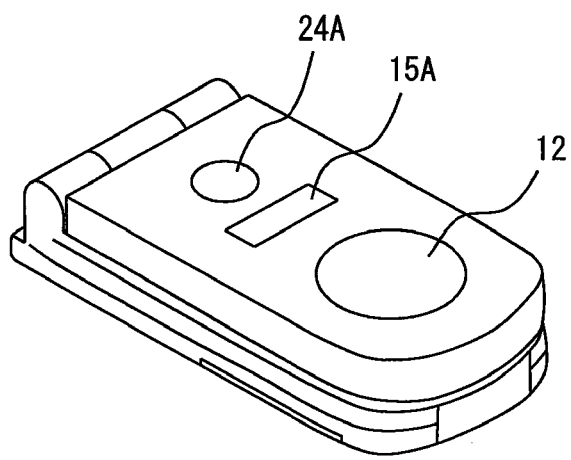

FIG. 1 is a perspective view of a mobile phone according to an embodiment of the present invention. FIG. 1(A) shows the mobile phone in the state of an open style, while FIG. 1(B) shows the mobile phone in the state of a closed style. Referring to FIGS. 1(A) and 1(B), a mobile phone 1 includes an operation side portion 3 and a display side portion 2. Operation side portion 3 has operation keys 14 including a power key 14A, ten keys, and a talk key, and a microphone 13 arranged on its inner surface, and a microphone terminal 16 and an earphone terminal 17 arranged on its right side. Display side portion 2 has a liquid crystal display (LCD) 15, a first speaker 11 constituting a receiver, and a camera 24 arranged on its inner surface, and a camera 24A, a small LCD 15A, and a second speaker 12 arranged on its outer surface. Although mobile phone 1 has LCD 15 in this example, LCD 15 may be replaced with an organic EL (Electro-Luminescence) display. Operation side portion 3 and display side portion 2 are rotatably connected via a hinge mechanism to be freely opened and closed. The state where mobile phone 1 is folded and operation side portion 3 and display side portion 2 are in the closed state corresponds to a closed style, while the state where mobile phone 1 is open and operation side portion 3 and display side portion 2 are in the open state corresponds to an open style.

Figure 2:
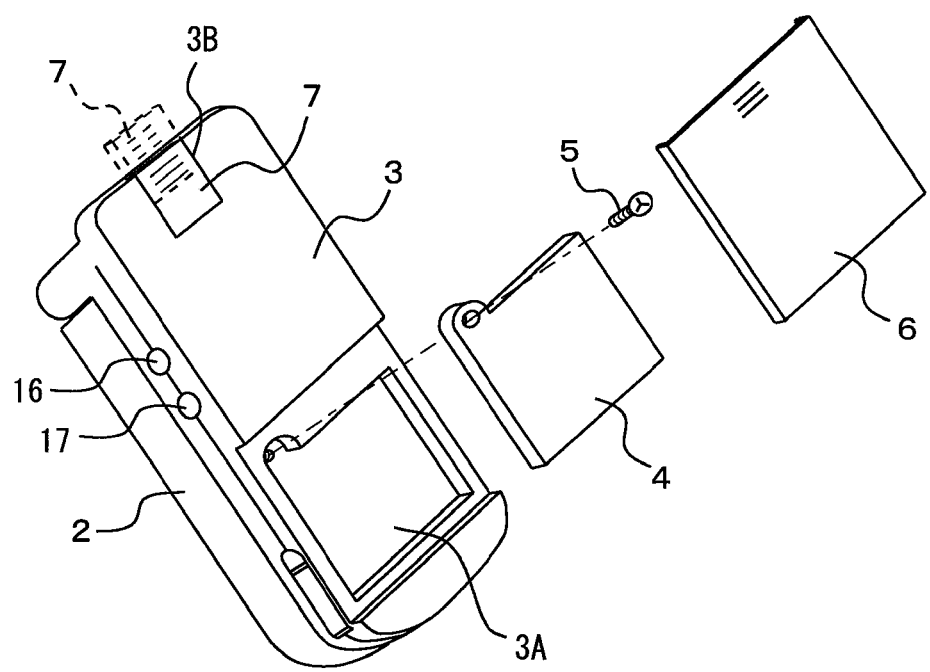
FIG. 2 is an exploded perspective view of the mobile phone according to the embodiment.

FIG. 2 is an exploded perspective view of the mobile phone according to the present embodiment. It is a perspective view of mobile phone 1 in the closed state (closed style) with the outer surface of operation side portion 3 seen from a diagonally upper direction. Referring to FIG. 2, mobile phone 1 includes a housing portion 3A for housing a battery 4 and a slide-type crime prevention switch 7 on the outer surface of operation side portion 3. Mobile phone 1 is provided with a buzzer generating circuit 34 (see FIG. 3). When crime prevention switch 7 is in an OFF state as is in a position housed in operation side portion 3, buzzer generating circuit 34 is open, and thus, it does not produce a buzzer sound from second speaker 12. When crime prevention switch 7 attains an ON state as it slides and a part of it moves to a position protruding from operation side portion 3, buzzer generating circuit 34 is closed, and it produces a buzzer sound from second speaker 12.

Battery 4 is housed in housing portion 3A and fixedly secured by a screw 5 to prevent easy removal thereof. This is for the purposes of preventing battery 4 from being removed to readily stop the buzzer sound during the time when crime prevention switch 7 is ON and buzzer generating circuit 34 outputs the buzzer sound from second speaker 12. With battery 4 fixedly secured to housing portion 3A, housing portion 3A is covered with a lid 6. Lid 6 is fitted and mounted to operation side portion 3. A screw 5 corresponding to a threaded hole of a special shape may be used for battery 4. Further, battery 4 can be held in the main body even in the state where screw 5 is removed, in which case normal use is enabled by closing lid 6. This allows mobile phone 1 to be used either in the state where screw 5 is removed or screw 5 is attached according to the user's need. Making battery 4 not removable by anyone is advantageous in that it would not readily be removed when the crime prevention buzzer is activated.

Figure 3:
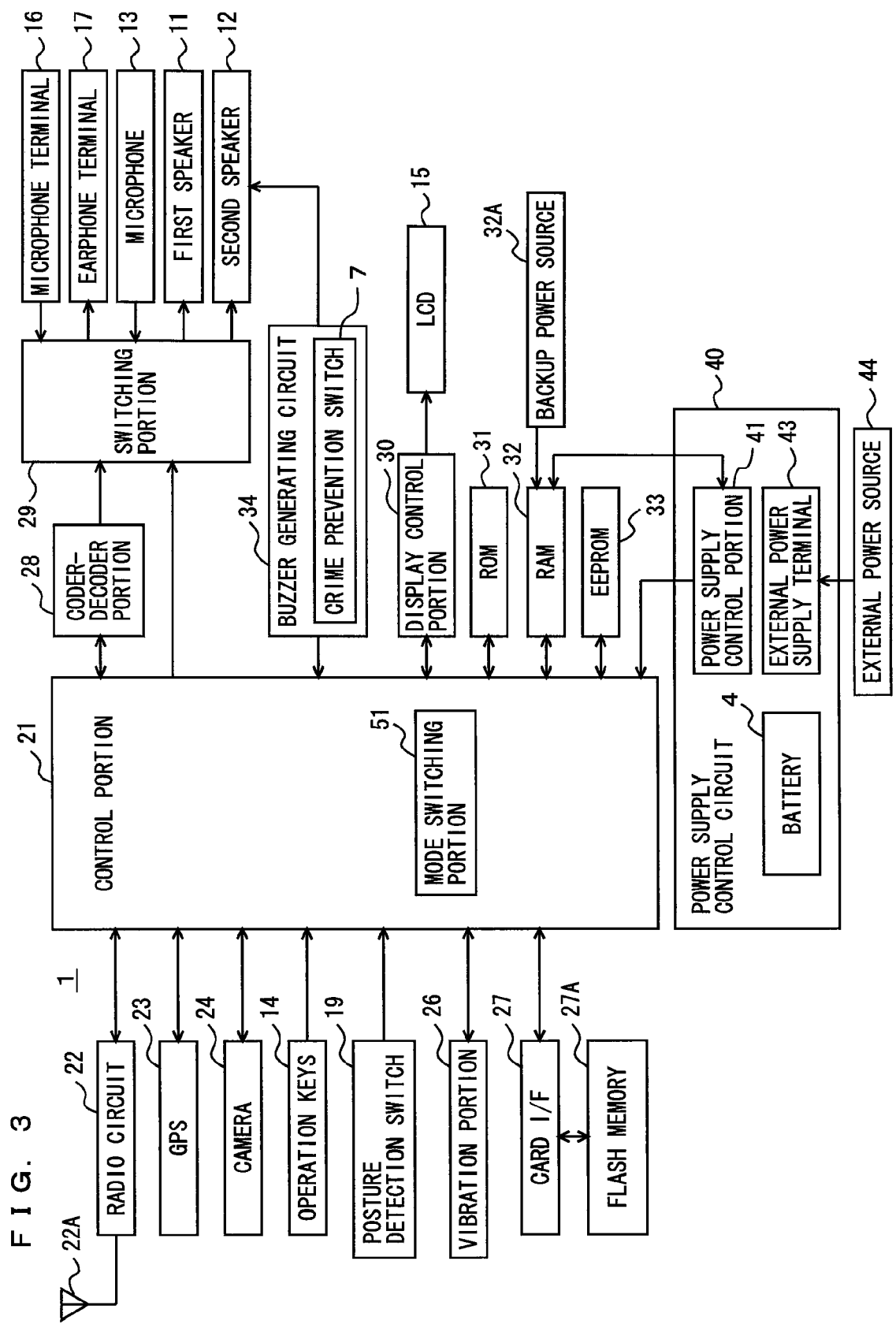
FIG. 3 is a functional block diagram showing an example of the functions of the mobile phone according to the embodiment.

FIG. 3 is a functional block diagram showing an example of the functions of the mobile phone of the present embodiment. Referring to FIG. 3, mobile phone 1 includes: a control portion 21 responsible for overall control of mobile phone 1; a radio circuit 22 connected to an antenna 22A; a coder-decoder portion 28 for processing audio data; a switching portion 29 for switching input/output of coder-decoder portion 28; a microphone 13, a first speaker 11, a second speaker 12, a microphone terminal 16, and an earphone terminal 17 each connected to switching portion 29; a camera 24; a global positioning system (GPS) 23 for measuring the position of mobile phone 1; operation keys 14 for accepting an input of user's operation; a posture detection switch 19; a vibration portion 26; a display control portion 30 for controlling display on LCD 15; a ROM (Read Only Memory) 31 for storing a program executed by control portion 21 and the like; a RAM (Random Access Memory) 32 used as a work area for control portion 21; an EEPROM (Electronically Erasable and Programmable ROM) 33 for storing address book data and the like in a non-volatile manner; and a power supply control circuit 40.

RAM 32, which is connected to a backup power source 32A, is supplied with power from backup power source 32A even in the state where power is not supplied from power supply control circuit 40, so that it can maintain the data stored therein without losing it. RAM 32 stores an emergency contact number, which is a telephone number selected in advance by the user of mobile phone 1. The emergency contact number is stored in RAM 32 as the user inputs the selected telephone number to mobile phone 1. RAM 32 is capable of storing one or more emergency contact numbers. Here, it is assumed that RAM 32 stores a first emergency contact number, a second emergency contact number, and a third emergency contact number. It is noted that the emergency contact number may be a telephone number included in the telephone directory data stored by mobile phone 1 in EEPROM 33, in which case a mark indicating that the relevant number corresponds to the emergency contact number may be added to the telephone directory data. Further, RAM 32 stores an emergency flag in a predetermined area. The emergency flag is set to ON when the mobile phone is in an emergency mode, while it is set to OFF when the mobile phone is not in the emergency mode.

Posture detection switch 19 detects relative positions of operation side portion 3 and display side portion 2, and outputs them to the control portion. Control portion 21 detects whether the posture of mobile phone 1 corresponds to the closed style or the open style based on the output of posture detection switch 19.

Radio circuit 22 receives and demodulates a radio signal received by antenna 22A, and outputs the resultant audio signal to coder-decoder portion 28. Further, radio circuit 22 receives and modulates an audio signal from coder-decoder portion 28, and outputs the resultant radio signal to antenna 22A. Coder-decoder portion 28 decodes an audio signal input from radio circuit 22, converts the decoded digital audio signal to an analog signal, and amplifies and outputs it to switching portion 29. Further, coder-decoder portion 28 receives an analog audio signal from microphone 13 or microphone terminal 16 via switching portion 29, converts the audio signal to a digital signal, and codes it and outputs the coded audio signal to radio circuit 22.

Switching portion 29, which is controlled by control portion 21, switches input/output of the audio signal with respect to coder-decoder portion 28. Switching portion 29 accepts an audio signal from coder-decoder portion 28, and outputs it to any one of earphone terminal 17, first speaker 11, and second speaker 12. In the case where an earphone is connected to earphone terminal 17, it outputs the audio signal accepted from coder-decoder portion 28 to earphone terminal 17. In the case where the earphone is not connected to earphone terminal 17, it outputs the audio signal accepted from coder-decoder portion 28 to second speaker 12 if mobile phone 1 is in a hands-free mode, while it outputs the audio signal accepted from coder-decoder portion 28 to first speaker 11 if mobile phone 1 is not in the hands-free mode. Mobile phone 1 is set to the hands-free mode in response to the user's operation of operation keys 14. Even if mobile phone 1 is not set to the hands-free mode in the state where a call is made in the open style, once mobile phone 1 is changed to the closed style, control portion 21 sets mobile phone 1 to the hands-free mode. Accordingly, while switching portion 29 outputs the audio signal accepted from coder-decoder portion 28 to first speaker 11 if mobile phone 1 is not set to the hands-free mode while a call is made in the open style, switching portion 29 outputs the audio signal accepted from coder-decoder portion 28 to second speaker 12 once the state of mobile phone 1 is changed to the closed style.

Switching portion 29 outputs the audio signal output from microphone 13 or microphone terminal 16 to coder-decoder portion 28. In the case where a microphone is connected to microphone terminal 16, switching portion 29 outputs the audio signal accepted from microphone terminal 16 to coder-decoder portion 28, while it outputs the audio signal accepted from microphone 13 to coder-decoder portion 28 when the microphone is not connected to microphone terminal 16.

Buzzer generating circuit 34 includes a crime prevention switch 7. Buzzer generating circuit 34 is connected to second speaker 12, and outputs a buzzer sound to second speaker 12 when crime prevention switch 7 is in an ON state. In this manner, the buzzer sound is generated from second speaker 12. Buzzer generating circuit 34 outputs the buzzer sound only to second speaker 12; it does not output the buzzer sound to first speaker 11 or earphone terminal 17. Further, buzzer generating circuit 34 outputs the state (closed state or open state) of buzzer generating circuit 34 to control portion 21.

Display control portion 30, under the control of control portion 21, controls LCD 16 in accordance with an instruction input from control portion 21, to cause LCD 16 to display an image. The image displayed by LCD 16 includes a moving image and a still image.

A removable flash memory 27A is mounted to a card I/F 27. Control portion 21 is capable of accessing flash memory 27A via card I/F 27. While it is here assumed that the program to be executed by control portion 21 is stored in ROM 31, the program may be stored in flash memory 27A, and read therefrom to be executed by control portion 21. The recording medium for storing the program is not restricted to flash memory 27A. It may be a flexible disk, a cassette tape, an optical disk (CD-ROM (Compact Disc-ROM), MO (Magnetic Optical Disc), MD (Mini Disc), DVD (Digital Versatile Disc)), an IC card (including a memory card), an optical card, or a semiconductor memory such as a masked ROM, an EPROM, an EEPROM, or the like. Still alternatively, mobile phone 1 may be connected to the Internet via radio circuit 22 and the program may be downloaded from a computer connected to the Internet, to be executed by control portion 21. As used herein, the "program" includes, not only the program directly executable by control portion 21, but also a program in the form of a source program, a compressed program, an encrypted program, and others.

Camera 24 is provided with a lens and a photoelectric conversion element such as a CMOS (Complementary Metal Oxide Semiconductor) sensor. The lens collects light and focuses it onto the CMOS sensor, and the CMOS sensor performs photoelectric conversion of the received light to output image data to control portion 21. Camera 24, controlled by control portion 21, starts an image pickup operation in accordance with an instruction from control portion 21, and outputs the obtained data of still or moving images to control portion 21. Camera 24 includes an image processing circuit which carries out image processing to improve image quality of the image data, and an A/D converter circuit which converts the image data from analog to digital form. Control portion 21 outputs the still or moving image data output from camera 24 to display control portion 30 to be displayed on LCD 15, or alternatively, it codes the still or moving image data by a compression coding scheme, to be stored in EEPROM 33 or flash memory 27A mounted to card I/F 27. Camera 24 picks up an image of the user of mobile phone 1 when mobile phone 1 functions as a video telephone.

Power supply control circuit 40 includes a power supply control portion 41, a battery 4, and an external power supply terminal 43 to which an external power source 44 is connected, and supplies power to each load of mobile phone 1. Battery 4 is a secondary battery such as a nickel cadmium battery, a nickel hydrogen battery, or a lithium polymer battery. External power supply terminal 43 is connected with external power source 44, which is an A/C adapter connected to a commercial power source. External power supply terminal 43 includes a connection terminal for a USB cable. In this case, external power source 44 is an electronic device connected to the USB cable. In the case where external power source 44 is connected to external power supply terminal 43, power supply control circuit 40 outputs the power supplied from external power source 44, while in the case where external power source 44 is not connected to external power supply terminal 43, it outputs the power supplied from battery 4. Power supply control portion 41 detects the voltage to be applied to each load including control portion 21 of mobile phone 1, to control the power to be supplied to the loads. Power supply control portion 41 detects the voltage of battery 4, and cuts off the power supply to each load of mobile phone 1 when the voltage of battery 4 becomes lower than the level required to drive each load of mobile phone 1, or when battery 4 is removed.

Power supply control circuit 40 is connected to power key 14A included in operation keys 14. In the state where a power source is connected, power supply control circuit 40 supplies power to power key 14A so as to detect depression of power key 14A. When the user's operation to depress power key 14A is detected in the state where power supply to each load of mobile phone 1 including control portion 21 is cut off, power supply control portion 41 supplies power to each load of mobile phone 1 including control portion 21. In the case where external power source 44 is connected to external power supply terminal 43, or in the case where another battery 4 storing adequate power is mounted, power supply control portion 41 carries out power supplying processing, which will be described later, to supply power to each load of mobile phone 1 including control portion 21, without detection of depression of power key 14A.

Control portion 21 includes a mode switching portion 51. Mode switching portion 51 switches a mode from a normal mode to an emergency mode upon detection of a closed state of buzzer generating circuit 34. In the emergency mode, control portion 21 carries out emergency processing. The emergency processing, which will be described later, is the processing that is not carried out in the normal mode. After switching of the mode to the emergency mode, mode switching portion 51 switches the mode from the emergency mode to the normal mode on the condition that the emergency processing is completed. This ensures that, after the mode is switched to the emergency mode, even if buzzer generating circuit 34 is open and generation of the buzzer sound is terminated, the emergency mode is maintained, without being switched to the normal mode, unless the emergency processing is finished. Mode switching portion 51 switches the mode from the emergency mode to the normal mode only when the emergency processing is completed or when release processing, which will be described later, is carried out by control portion 21. While mobile phone 1 is activated in the normal mode when supplied with power, mode switching portion 51 switches the mode to the emergency mode if the emergency flag stored in RAM 32 is ON.

Figure 4:
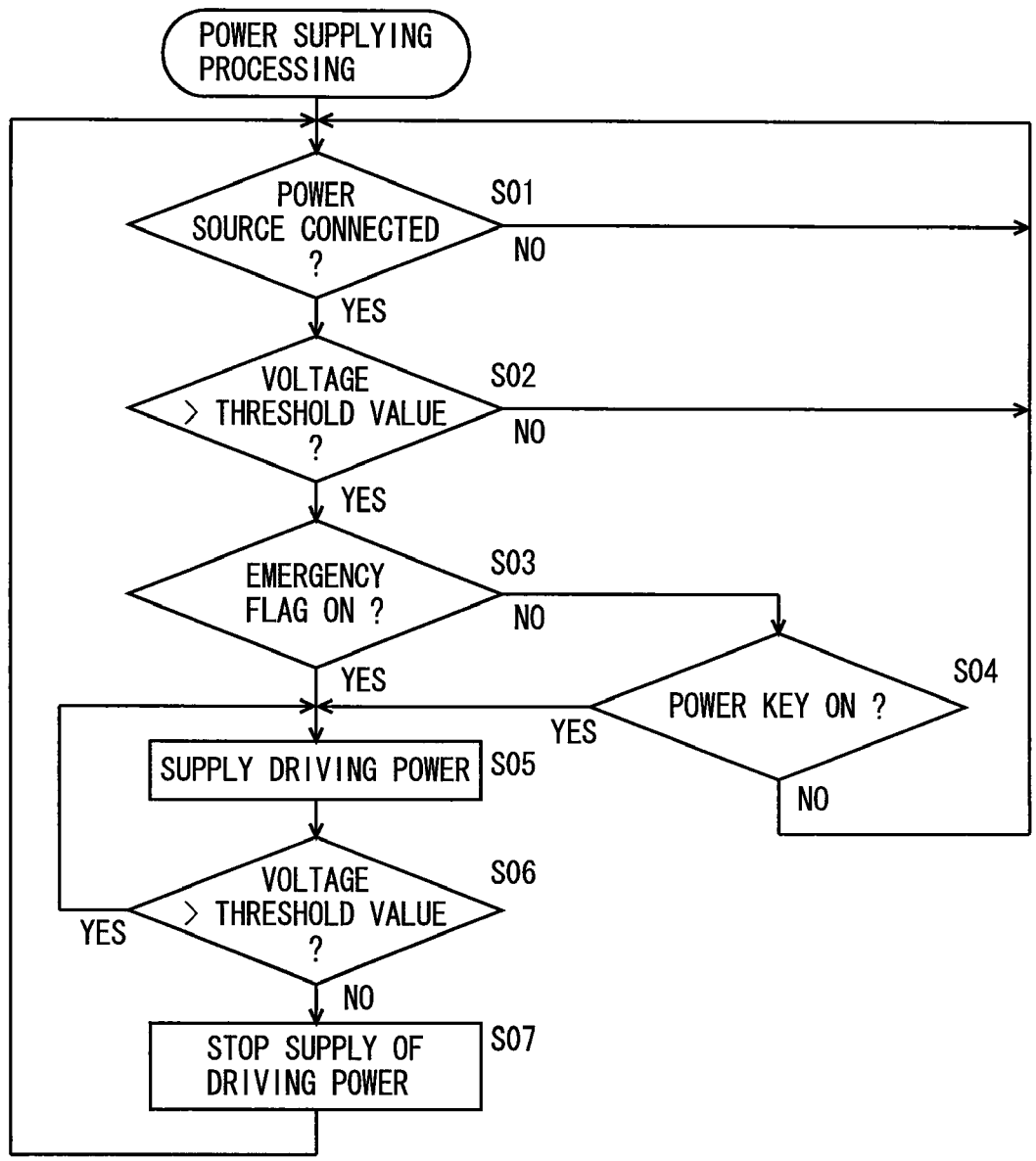
FIG. 4 is a flowchart illustrating an example of the flow of power supplying processing.

FIG. 4 is a flowchart illustrating an example of the flow of power supplying processing. The power supplying processing is carried out by power supply control portion 41. Power supply control portion 41 detects whether a power source is connected (step S01). The power source includes battery 4 and external power source 44. In the case where external power source 44 is connected to external power supply terminal 43, or in the case where battery 4 is mounted, it determines that a power source is connected. It then determines whether the voltage of the power source is greater than a predetermined threshold value (step S02). If the voltage of the power source exceeds the threshold value, it moves the process to step S03; otherwise, it returns the process to step S01. The process returns to step S01 when battery 4 mounted is not charged sufficiently.

In step S03, it is determined whether the emergency flag is set to ON. With an area in RAM 32 being pre-assigned to the emergency flag, power supply control portion 41 reads the emergency flag stored in the area to determine whether the emergency flag is set to ON. The emergency flag is the flag indicating whether mobile phone 1 is in the normal mode or in the emergency mode. The emergency flag is written by control portion 21 into the area in RAM 32 pre-assigned thereto.

If the emergency flag is set to ON, the process proceeds to step S05; otherwise, the process proceeds to step S04. In step S04, it is determined whether power key 14A is ON. If depression of power key 14A is detected, the process proceeds to step S05; otherwise, the process returns to step S01.

In step S05, power is supplied to each load of mobile phone 1 including control portion 21. It is then determined whether the voltage of the power source is greater than a predetermined threshold value (step S06). If the voltage of the power source exceeds the threshold value, the process returns to step S05; otherwise, the process proceeds to step S07. The process proceeds to step S07 in the case where the charge level of battery 4 is lowered, or external power source 44 is removed and disconnected from external power supply terminal 43. In step S07, power supply to each load of mobile phone 1 including control portion 21 is stopped, whereby control portion 21 ceases to operate.

As described above, when a power source is connected, in the case where the emergency flag is not set to ON, power supply control portion 41 supplies power to control portion 21 on the condition of depression of power key 14A. By comparison, in the case where the emergency flag is set to ON, power supply control portion 41 supplies power to control portion 21 without detecting depression of power key 14A. Accordingly, in the emergency mode of mobile phone 1, when power supply is restarted after interruption thereof, the power can be supplied to control portion 21, requiring no user's operation of mobile phone 1, to allow control portion 21 to carry out the emergency processing, which will be described later.

Figure 5:
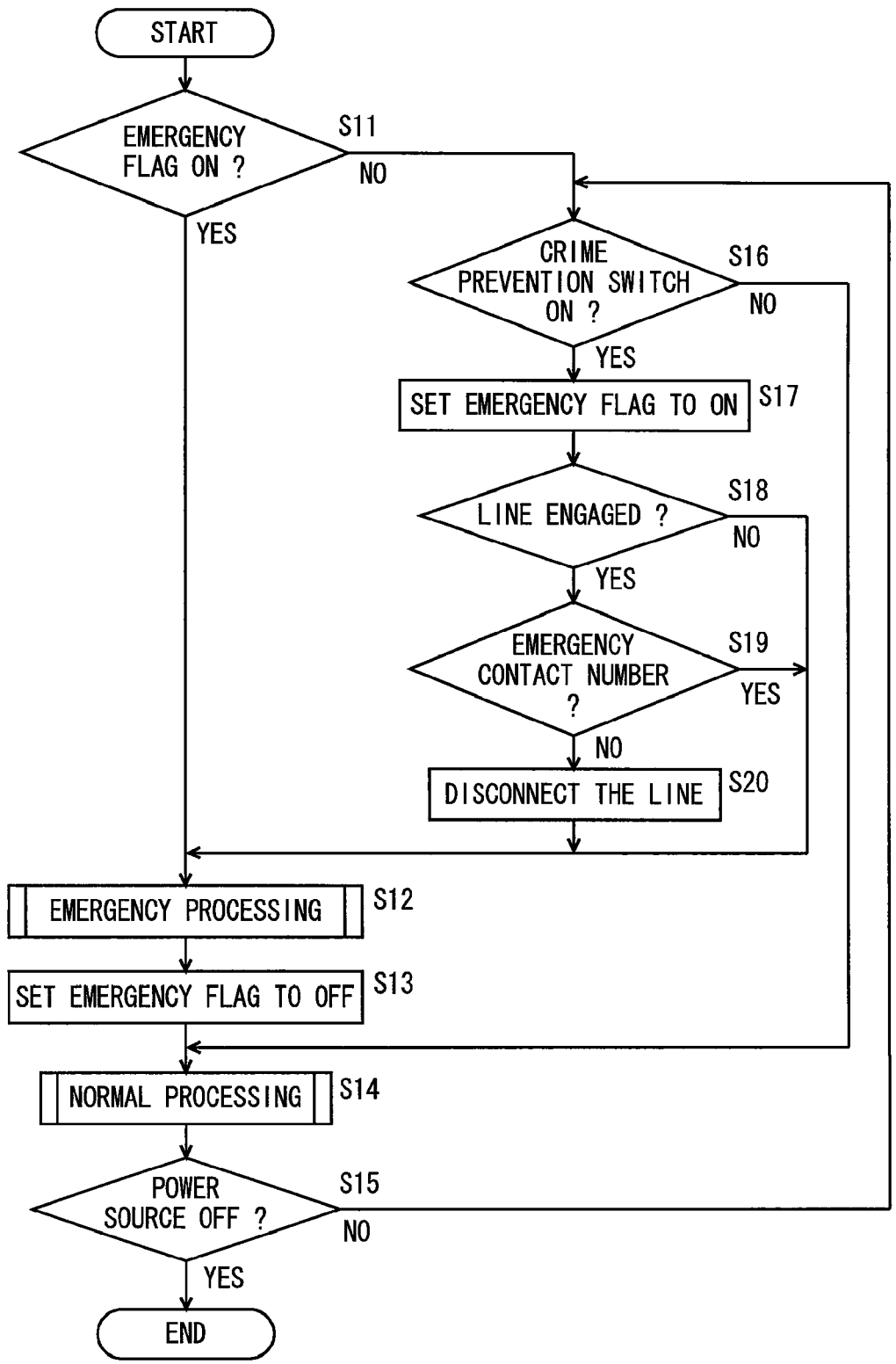
FIG. 5 is a flowchart illustrating an example of the flow of main processing carried out by a control portion of the mobile phone.

FIG. 5 is a flowchart illustrating an example of the flow of main processing which is carried out by the control portion of the mobile phone. The main processing is carried out by control portion 21 after it is activated with power supplied thereto. Control portion 21 determines whether the emergency flag is set to ON (step S11). Specifically, control portion 21 reads data in the area in RAM 32 pre-assigned to the emergency flag, to determine whether the emergency flag is set to ON. If the emergency flag is set to ON, the process proceeds to step S12; otherwise, the process proceeds to step S16. When the process proceeds to step S12, mobile phone 1 is switched to the emergency mode by mode switching portion 51. In step S12, the emergency processing is carried out, which will be described later in detail. The emergency flag is then set to OFF (step S13). Specifically, the data in the area in RAM 32 pre-assigned to the emergency flag is changed to OFF, whereby the mobile phone is switched from the emergency mode to the normal mode. When the process proceeds to step S13, mobile phone 1 is switched to the normal mode by mode switching portion 51. In the following step S14, normal processing is carried out, which is the processing carried out in the normal mode. It is then determined whether an instruction to turn OFF the power source has been accepted (step S15). If so, the process is terminated; otherwise, the process proceeds to step S16. The instruction to turn OFF the power source is for example an operation of depressing power key 14A for more than a predetermined time.

In step S16, it is determined whether crime prevention switch 7 has been switched to ON. If crime prevention switch 7 is switched to ON, the process proceeds to step S17; otherwise, the process proceeds to step S14. When control portion 21 detects that the state of buzzer generating circuit 34 is changed to the closed state, it determines that crime prevention switch 7 has been switched to ON. When the process proceeds to step S17, mode switching portion 51 switches mobile phone 1 to the emergency mode. In step S17, the emergency flag is set to ON. Specifically, the data in the area in RAM 32 pre-assigned to the emergency flag is changed to ON.

In step S18, it is determined whether the line is engaged. If so, the process proceeds to step S19; otherwise, the process proceeds to step S12. In step S19, it is determined whether the telephone number assigned to the other party on the line corresponds to an emergency contact number. In the case where there is more than one emergency contact number, if it does not correspond to any of them, the process proceeds to step S20. If it corresponds to one of them, the process proceeds to step S12. In step S20, the line is disconnected, to expedite execution of the emergency processing, which will be described below.

As described above, control portion 21 carries out the main processing when supplied with power. In execution of the main processing, firstly, it reads the emergency flag, and carries out the emergency processing if the emergency flag is set to ON. Control portion 21 sets the emergency flag to ON in the emergency mode. This ensures that, even if the emergency processing is interrupted as the power is cut off while mobile phone 1 is in the emergency mode, control portion 21 can execute the emergency processing when power is supplied next time, because the emergency flag is ON. Further, in the case where the power is cut off while mobile phone 1 is in the normal mode, the emergency flag is not set to ON when power is supplied next time, which prevents control portion 21 from executing the emergency processing.

Figure 6:
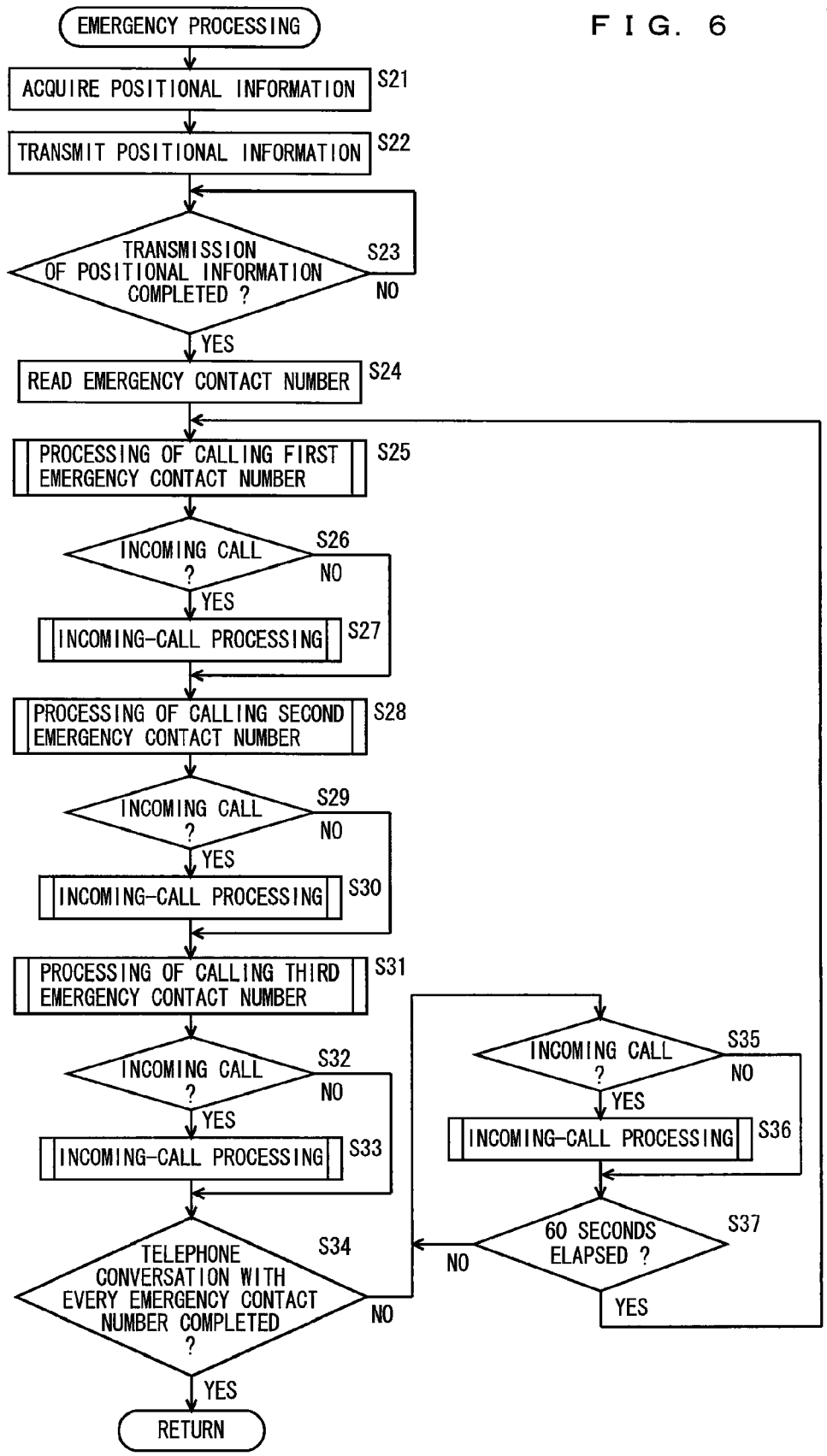
FIG. 6 is a flowchart illustrating an example of the flow of emergency processing.

FIG. 6 is a flowchart illustrating an example of the flow of the emergency processing. The emergency processing is carried out in step S12 in FIG. 5. That is, the emergency processing is carried out when mobile phone 1 is in the emergency mode with the emergency flag set to ON. Referring to FIG. 6, control portion 21 acquires positional information (step S21). Specifically, it causes GPS 23 to acquire the position of mobile phone 1, and accepts the positional information output from GPS 23. Control portion 21 transmits the acquired positional information to a predetermined transmission destination (step S22). It then enters a standby mode until completion of transmission of the positional information (NO in step S23), and once the transmission of the positional information is completed, it moves the process to step S24. Although the processing in and after step S24 may be carried out rather than awaiting completion of the transmission of the positional information, completing the transmission of the positional information is one of the requisites for termination of the emergency processing.

In step S24, the emergency contact number is read from RAM 32. Here, it is assumed that three telephone numbers of first through third emergency contact numbers are read. Then, processing of calling the first emergency contact number is carried out (step S25). The processing of calling the first emergency contact number, which will be described later, is the processing enabling a telephone conversation with the telephone set having the first contact number. When the processing of calling the first emergency contact number is finished, it is determined whether an incoming call has been detected (step S26). If the incoming call is detected, the process proceeds to step S27; otherwise, the process proceeds to step S28, with step S27 being skipped. Next, processing of calling the second emergency contact number is carried out (step S28). The processing of calling the second emergency contact number, which will be described later, is the processing enabling a telephone conversation with the telephone set having the second contact number. When the processing of calling the second emergency contact number is finished, it is determined whether an incoming call has been detected (step S29). If the incoming call is detected, the process proceeds to step S30; otherwise, the process proceeds to step S31, with step S30 being skipped. Then, processing of calling the third emergency contact number is carried out (step S31). The processing of calling the third emergency contact number, which will be described later, is the processing enabling a telephone conversation with the telephone set having the third contact number. When the processing of calling the third emergency contact number is finished, it is determined whether an incoming call has been detected (step S32). If the incoming call is detected, the process proceeds to step S33; otherwise, the process proceeds to step S34, with step S33 being skipped. The processing of calling the first emergency contact number, the processing of calling the second emergency contact number, and the processing of calling the third emergency contact number are identical except for the emergency contact number to be handled, and therefore, they are hereinafter collectively referred to as the calling processing.

In step S34, it is determined whether telephone conversations with all the telephone sets of the first through third emergency contact numbers have been enabled and completed. For example, a completion flag may be added to the emergency contact number with which a telephone conversation has been enabled and completed, in which case it is determined whether the completion flags are added to all the emergency contact numbers. If the telephone conversations with all the telephone sets of the first through third emergency contact numbers have been enabled, the process is terminated. If the telephone conversation with any one of the telephone sets of the first through third emergency contact numbers has not be enabled, the process proceeds to step S35.

In step S35, it is determined whether an incoming call has been detected. If the incoming call is detected, the process proceeds to step S36; otherwise, the process proceeds to step S37, with step S36 being skipped. In step S36, incoming-call processing is carried out. In step S37, it is determined whether 60 seconds have passed. If 60 seconds have passed, the process returns to step S25; otherwise, the process returns to step S35. The starting point of the 60 seconds may correspond to the time when the calling processing lastly executed among steps S25, S28, and S31 is finished, or in the case where the incoming-call processing is carried out in step S27, S30 or S33, it may correspond to the time when the incoming-call processing lastly executed is finished. That is, the incoming-call processing is carried out if there is an incoming call within 60 seconds after completion of the calling processing, or if there is an incoming call within 60 seconds after completion of the incoming-call processing in the case where the incoming-call processing is carried out (step S36). If there is no incoming call during the period, the processing in and after step S25 is carried out again.

When the processing in and after step S25 is to be performed for the second time or later, in the case where a call to the telephone set having the first emergency contact number was successfully made in step S25 before, step S25 is skipped thereafter. Likewise, in the case where a call to the telephone set having the second emergency contact number was successfully made in step S28 before, step S28 is skipped thereafter. In the case where a call to the telephone set having the third emergency contact number was successfully made in step S31 before, step S31 is skipped thereafter.

It may be possible to allow the user to set the mode to invalidate the calling processing even if a telephone number as an emergency contact number has been registered.

Figure 7:
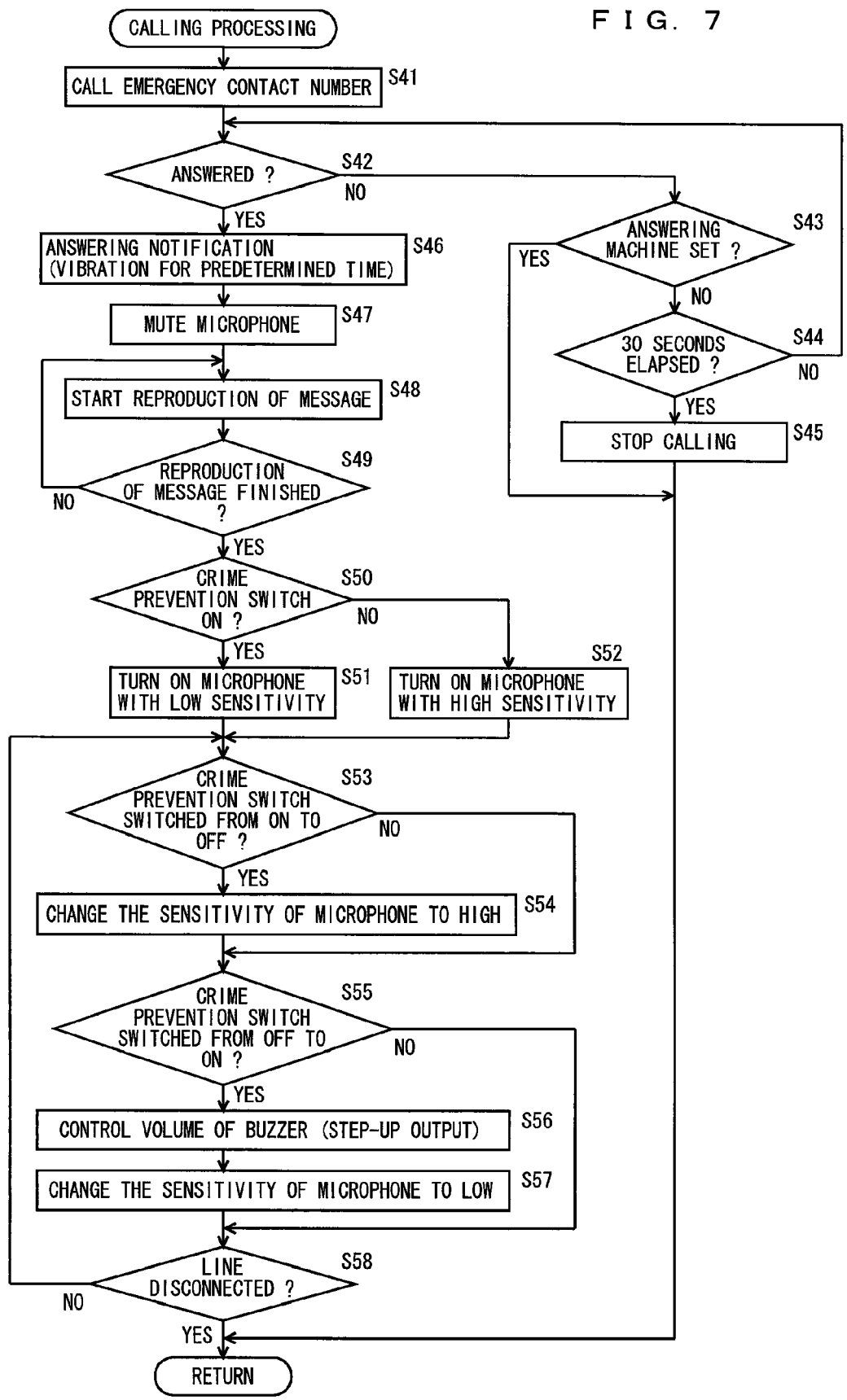
FIG. 7 is a flowchart illustrating an example of the flow of calling processing.

FIG. 7 is a flowchart illustrating an example of the flow of the calling processing. The calling processing is carried out in steps S25, S28, and S31 in FIG. 6. Referring to FIG. 7, an emergency contact number is called (step S41). It is then determined whether the telephone set assigned the emergency contact number has answered (step S42). The call is established when the telephone set with the emergency contact number answers. If the telephone set with the emergency contact number answers, the process proceeds to step S46; otherwise, the process proceeds to step S43. In step S43, it is determined whether an answering machine is on. If so, the process is terminated; otherwise, the process proceeds to step S44. Specifically, it is determined that the answering machine has been set if a signal indicating that the answering machine is on is received from the communication network. In step S44, it is determined whether 30 seconds have passed after originating a call. If so, the process proceeds to step S45; otherwise, the process returns to step S42. After the emergency contact number is called in step S41, if an answering machine is set at the emergency contact number, the process is terminated immediately. Otherwise, the calling is continued for 30 seconds. If there is no answer within 30 seconds, the process is terminated. This is for the purposes of expediting a call to the telephone set having a next emergency contact number, by restricting the time for calling one emergency contact number so as not to continuously call the same number which does not answer for a long time.

In step S46, vibration portion 26 is caused to vibrate for a predetermined period of time. Although the user can set the vibration at the time of normal calling, the processing in step S46 may cause the vibration regardless of the user's setting (i.e., regardless of the vibration mode). While an emergency contact number is called in step S41, this call is automatically originated by mobile phone 1 in the emergency mode, not based on the calling operation by the user of mobile phone 1. This means that the call may be made before the user knows and the call may be answered again before the user knows. As such, causing vibration portion 26 to vibrate at the time when there is an answer ensures that the user is notified that it is possible to communicate with the telephone set having the emergency contact number. Further, the calling processing may be carried out while crime prevention switch 7 is ON, in which case notifying the user by vibration rather than by sound can allow the user to readily realize that the telephone conversation with the telephone set having the emergency contact number is possible.

In step S47, the output of microphone 13 is muted, and reproduction of a predetermined message is started (step S48). The reproduced message is transmitted to the telephone set of the emergency contact number with which the call has been established. The message is the one which can notify the user of the telephone set having the emergency contact number that something urgent has happened like the following: "Emergency. Please help." It is then determined whether reproduction of the message is finished (step S49). If the reproduction of the message is finished, the process proceeds to step S50; otherwise, the process returns to step S48. The output of microphone 13 is muted while the message is reproduced and transmitted to the emergency contact number. This can prevent the undesirable event that the message is deafened by the buzzer sound taken in from microphone 13 and cannot be conveyed to the user of the telephone set having the emergency contact number. While vibration portion 26 is caused to vibrate for notification of the answer in step S46, vibration portion 26 may be caused to vibrate until completion of the reproduction of the message in step S49. This allows the user to be notified, upon termination of vibration of vibration portion 26, that the telephone conversation is possible now that the reproduction of the message is finished.

In step S50, it is determined whether crime prevention switch 7 is in an ON state. If so, the process proceeds to step S51; otherwise, the process proceeds to step S52. Control portion 21 determines that crime prevention switch 7 is in the ON state while it detects the closed state of buzzer generating circuit 34, whereas it determines that crime prevention switch 7 is in the OFF state while it detects the open state of buzzer generating circuit 34. In step S51, microphone 13 is turned ON with low sensitivity. Because buzzer generating circuit 34 is outputting the buzzer sound from second speaker 12, the buzzer sound collected by microphone 13 is restricted as much as possible to prevent the buzzer sound from being output in a large volume from a speaker provided in the telephone set of the emergency contact number. On the other hand, in step S52, microphone 13 is turned ON with high sensitivity. Because buzzer generating circuit 34 does not output the buzzer sound from second speaker 12, it is unnecessary to lower the sensitivity of microphone 13.

In step S53, it is determined whether crime prevention switch 7 has been switched from ON to OFF. If crime prevention switch 7 is switched to OFF, the process proceeds to step S54; otherwise, the process proceeds to step S55, with step S54 being skipped. When crime prevention switch 7 is switched to OFF, buzzer generating circuit 34 no longer outputs the buzzer sound to second speaker 12. Thus, the sensitivity of microphone 13 is raised in step S54.

In step S55, it is determined whether crime prevention switch 7 has been switched from OFF to ON. If crime prevention switch 7 is switched to ON, the process proceeds to step S56; otherwise, the process proceeds to step S57. When crime prevention switch 7 is switched to ON, buzzer generating circuit 34 is closed, and thus, buzzer generating circuit 34 causes the buzzer sound to be output to second speaker 12. In step S56, buzzer generating circuit 34 is controlled to control the volume of the buzzer sound. Specifically, buzzer generating circuit 34 is caused to output the buzzer sound to second speaker 12 by increasing the volume in a stepwise manner over time. For example, buzzer generating circuit 34 outputs the buzzer sound in a small volume for first five seconds, in a middle volume for the next five seconds, and thereafter, it outputs the buzzer sound in a large volume. In this manner, the buzzer sound output from second speaker 12 is increased in volume in a stepwise manner over time. This way of outputting the buzzer sound is called step-up output. Since the buzzer sound is output with a gradually increased volume instead of being output in a large volume from the beginning, the buzzer sound is prevented from being output in a large volume abruptly from the speaker of the telephone set assigned the emergency contact number. In step S57, the sensitivity of microphone 13 is lowered, as in step S51. The volume of the buzzer sound may be increased in proportion to the lapse of time, rather than being increased in a stepwise manner. Further, the order of steps S56 and S57 may be reversed, which can restrict the influence of the notification by the buzzer sound again.

In step S58, it is determined whether the line has been disconnected. If the line is disconnected, the process is terminated; otherwise, the process returns to step S53.

Figure 8:
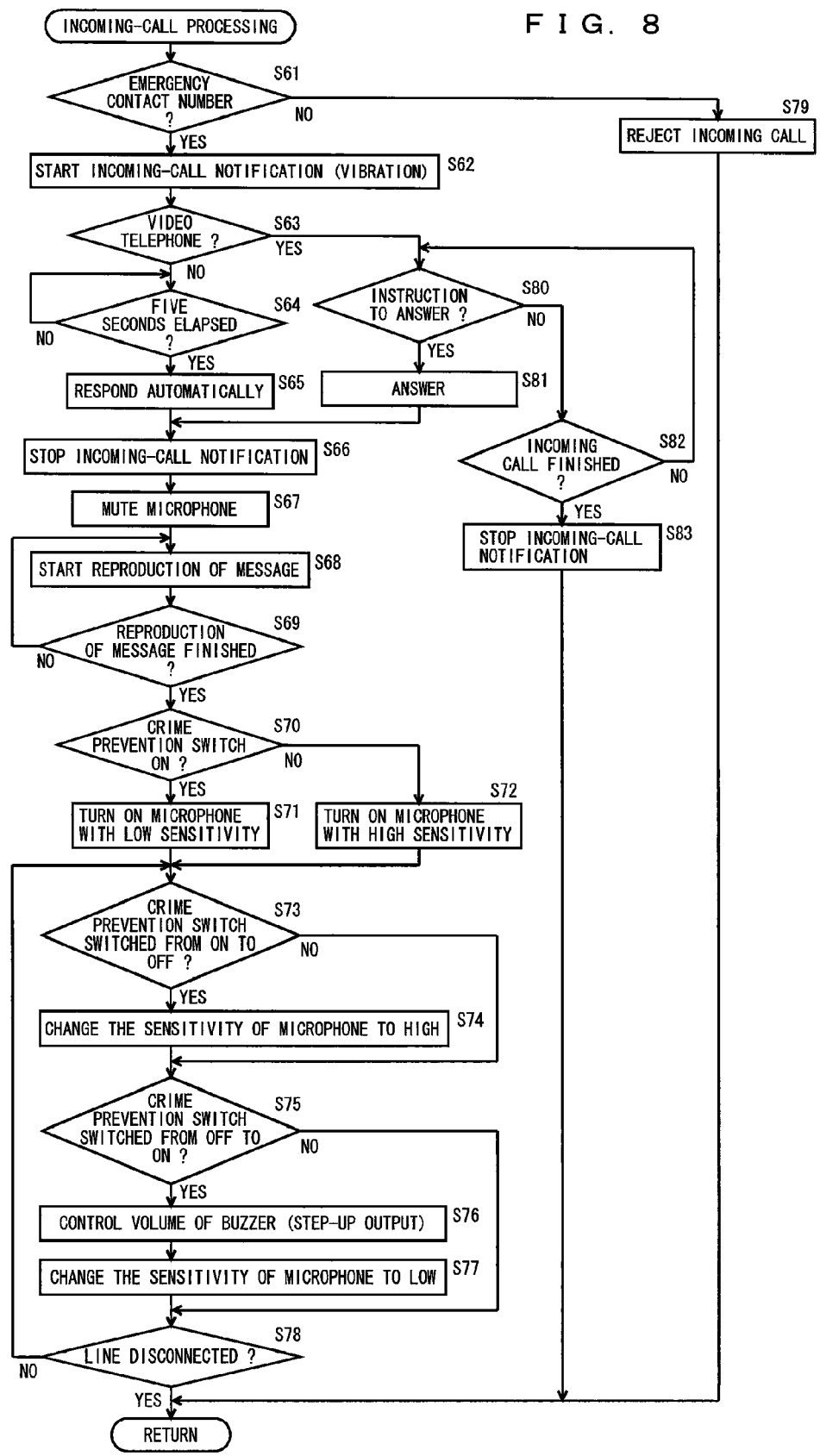
FIG. 8 is a flowchart illustrating an example of the flow of incoming-call processing.

FIG. 8 is a flowchart illustrating an example of the flow of incoming-call processing. The incoming-call processing is carried out in respective steps S27, S30, S33, and S36 in FIG. 6 when an incoming call is detected. Referring to FIG. 8, control portion 21 determines whether the incoming call is from the telephone set assigned the emergency contact number (step S61). Specifically, it determines whether the telephone number received together with the detected incoming call is stored in RAM 32 as the emergency contact number. If the incoming call is from the telephone set with the emergency contact number, the process proceeds to step S62; otherwise, the process proceeds to step S79. In step S79, the incoming call is rejected and the process is terminated. This is to prevent the line from being connected with the telephone set having a telephone number other than the emergency contact number, so as to allow only the phone calls with the telephone sets necessary in the event of an emergency.

In step S62, incoming-call notification is made to notify the user of the incoming call. The incoming-call notification is made by vibration of vibration portion 26. Vibration portion 26 is caused to vibrate in step S62 even if notification by vibration of vibration portion 26 is not set for the incoming-call notification. Crime prevention switch 7 may have been switched to ON, in which case notification by vibration rather than by sound can allow the user to readily become aware of the incoming call. In the emergency mode, vibration portion 26 is caused to vibrate for notification of the incoming call, regardless of whether the buzzer sound is heard. Thus, even when crime prevention switch 7 is switched to OFF while vibration portion 26 is vibrating, the vibration is continued until the incoming-call notification is stopped in step S66, as will be described later. While the incoming-call notification may be made by a ringing tone in the normal mode, in the emergency mode, the buzzer sound may be generated, and therefore, the incoming-call notification is made by vibration of vibration portion 26 rather than by the ringing tone.

It is then determined whether the incoming call from the emergency contact number requires a telephone conversation via a video telephone (step S63). If so, the process proceeds to step S80; otherwise, the process proceeds to step S64. In step S64, the standby mode is maintained for five seconds (NO in step S64), and when five seconds have passed, the process proceeds to step S65. As such, the incoming-call notification that was started in step S62 is continued for five seconds, although the standby time is not restricted to five seconds but may be any predetermined time. In step S65, the incoming call is automatically answered, which enables a telephone conversation with the telephone set having the emergency contact number. The user of mobile phone 1 only needs to switch crime prevention switch 7 to ON to enable the telephone conversation with the telephone set having the emergency contact number when there is a call from that telephone set. This allows the user to deal with the emergency without being bothered by the operation on mobile phone 1. In step S66, the incoming-call notification that was started in step S62 is stopped. Specifically, vibration of vibration portion 26 is stopped.

The processing in steps S67 through S78 is identical to the processing in steps S47 through S58 in FIG. 7, and thus, description thereof will not be repeated here.

The process proceeds to step S80 in the case where the incoming call requiring a telephone conversation via a video telephone is detected. In step S80, it is determined whether an instruction to answer has been accepted. If the user's operation to depress the talk button in the operation keys is detected, the process proceeds to step S81; otherwise, the process proceeds to step S82. This is to allow the user to freely decide whether to answer the incoming call requiring the phone conversation via a video telephone. In steps S63 through S65, it is prohibited to automatically answer the incoming call requiring the phone conversation via a video telephone. If it is set to automatically answer the incoming call requiring the phone conversation via a video telephone, the images that the user does not want to be taken may be transmitted. Thus, it is configured to confirm the user's intention. It is also for preventing the video telephone from being used for mischief, so as to protect the personal privacy.

In step S81, the incoming call is answered. This enables the telephone conversation via a video telephone with the telephone set having the emergency contact number. The user of mobile phone 1 only needs to switch crime prevention switch 7 to ON to be able to talk to the telephone set having the emergency contact number when there is an incoming call therefrom, and accordingly, the user can address the emergency without being bothered by the operation on mobile phone 1. In step S66, the incoming-call notification that was started in step S62 is stopped. Specifically, vibration of vibration portion 26 is stopped.

In step S82, it is determined whether the incoming call is finished. If so, the process proceeds to step S83; otherwise, the process returns to step S80. In step S83, the incoming-call notification that was started in step S62 is finished, whereby the processing is terminated.

FIG. 9 is a flowchart illustrating an example of the flow of release processing. The release processing is carried out by control portion 21 to release the emergency mode. When control portion 21 detects depression of a prescribed operation button while mobile phone 1 is in the emergency mode, it generates an interrupt to carry out the release processing. The prescribed operation button is the button predetermined in operation keys 14.

Referring to FIG. 9, control portion 21 causes a personal identification number input screen to be displayed on LCD 15 (step S91). When the personal identification number is accepted (YES in step S92), it performs authentication of the accepted personal identification number (step S93). Specifically, the accepted personal identification number is compared with the persona identification numbers prestored in RAM 32 or the like. If they match, the personal identification number accepted is authenticated, while it is not authenticated if the numbers do not match. If the authentication is successful, the process proceeds to step S94; otherwise, the process is terminated. While the personal identification number is used here for authentication, biological information such as fingerprint, iris, or vein pattern may also be used for authentication.

In step S94, the emergency flag is set to OFF. Specifically, the data in the area in RAM 32 pre-assigned to the emergency flag is changed to OFF. This causes the mobile phone to be switched from the emergency mode to the normal mode. The emergency processing is terminated (step S95) to complete the processing. The emergency processing is finished at this stage even if the emergency processing shown in FIG. 6 is in progress. For example, in the case where the processing of calling the first emergency contact number is in progress and an answer to the calling operation is being awaited, the calling operation is stopped to terminate the processing. This allows the above-described emergency processing to be cancelled in the middle even if the user erroneously switches crime prevention switch 7 to ON.

Crime prevention switch 7 may be switched to ON in the state where a telephone conversation with the telephone set having the emergency contact number, for example the first emergency contact number, is possible (step S16 in FIG. 5), in which case the emergency processing shown in FIG. 6 is carried out (step S12). The emergency processing is carried out after execution of the processing in steps S67 through S78 in the incoming-call processing shown in FIG. 8. As such, the message indicating an emergency is transmitted to the other party on the line. This allows the occurrence of an emergency to be notified automatically to the other party on the line. Further, it is preferable that a completion flag is added to the first emergency contact number at the time when the state enabling the telephone conversation with the telephone set having the first emergency contact number is over, i.e., at the time when the processing in steps S67 through S78 in the incoming-call processing is finished, so as to prevent execution of the processing of calling the first emergency contact number (step S25 in FIG. 6). This prevents the call from being established with the same telephone set again.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A mobile information terminal comprising:
a power control unit to supply driving power;
a storage unit to store data in the state where the driving power is not supplied from said power control unit;
a detecting unit to detect an occurrence of an emergency; and
a control unit which is driven as the driving power is supplied from said power control unit, said control unit including:
a mode information storage unit to store mode information indicating an emergency mode in said storage unit in response to detection of the occurrence of the emergency by said detecting unit,
an emergency processing executing unit to execute predetermined processing in response to detection of the occurrence of the emergency by said detecting unit, and
a startup-time processing unit to execute said predetermined processing when said control unit is activated as the supply of the driving power from said power control unit is started and in the case where said mode information indicating the emergency mode is stored in said storage unit
wherein said power control unit comprises
a voltage detecting unit to detect a voltage of a power source, and
an emergency activation unit to start supply of the driving power to said control unit in response to said detected voltage exceeding a predetermined threshold value and said mode information indicating the emergency mode is stored in said storage unit.

2. The mobile information terminal according to claim 1, further comprising an accepting unit to accept a drive instruction for instructing driving of said control unit, wherein said power control unit includes a normal activation unit for supplying the driving power to said control unit when said detected voltage exceeds a predetermined threshold value and in the case where said mode information indicating the emergency mode is not stored in said storage unit, on the condition that said drive instruction is accepted by said accepting unit.

3. The mobile information terminal according to claim 1, wherein said voltage detecting unit detects a voltage of a removable battery.

4. The mobile information terminal according to claim 1, wherein said voltage detecting unit detects a voltage of an external power source.

5. The mobile information terminal according to claim 1, wherein said emergency processing executing unit includes a position detecting unit to detect a current position, and a transmission unit to transmit said detected current position.

6. A mobile information terminal comprising:
a detecting unit to detect an occurrence of an emergency;
a storage unit to store as a predetermined destination a telephone number in advance;
a mode switching unit to switch a mode to an emergency mode in response to detection of the occurrence of the emergency by said detecting unit;
an incoming call detecting unit to detect an incoming call; and
an answering unit that
answers the incoming call detected by said incoming call detecting unit in the emergency mode in a case where the incoming call is associated with said telephone number prestored in said storage unit,
determines whether the incoming call requires a video telephone, and
does not answer the incoming call if it is determined that the incoming call requires a video telephone.

7. The mobile information terminal according to claim 6, further comprising a rejecting unit to reject the incoming call detected by said incoming call detecting unit in the emergency mode in the case where the incoming call is not associated with said telephone number prestored in said storage unit.

8. The mobile information terminal according to claim 6, further comprising:
a warning sound generating unit to generate a warning sound in response to detection of the occurrence of the emergency by said detecting unit;
a vibration generating unit to generate vibration; and
an incoming-call answering notification unit to activate said vibration generating unit when said answering unit answers in the emergency mode.

9. The mobile information terminal according to claim 6, wherein said answering unit does not answer the incoming call detected by said incoming call detecting unit in the case where the incoming call is not associated with said telephone number prestored in said storage unit.

10. A mobile information terminal comprising:
a detecting unit to detect occurrence of an emergency;
a storage unit to store a telephone number in advance;
a warning sound generating unit to generate a warning sound in response to detection of the occurrence of the emergency by said detecting unit;
a vibration generating unit to generate vibration;
a mode switching unit to switch a mode to an emergency mode in response to detection of the occurrence of the emergency by said detecting unit;
an interlock calling unit to call the telephone number prestored in said storage unit in the emergency mode; and
an outgoing-call answering notification unit to activate said vibration generating unit in the case where an answer to the call originated by said interlock calling unit is detected.

11. The mobile information terminal according to claim 10, wherein
said storage unit is capable of storing a plurality of said telephone numbers,
said interlock calling unit includes a selecting unit for selecting said plurality of telephone numbers, and
said selecting unit selects a next telephone number in the case where an answer to a call originated to a previously selected telephone number is not detected within a predetermined period of time after the origination of the call.

12. A mobile information terminal comprising:
a detecting unit to detect an occurrence of an emergency;
a storage unit to store a telephone number in advance;
a disconnecting unit to disconnect a call with a device on the other end when the occurrence of the emergency is detected by said detecting unit during the call and in the case where the telephone number assigned to said device on the other end is not prestored in said storage unit;
an interlock calling unit to call the telephone number prestored in said storage unit in response to detection of the occurrence of the emergency by said detecting unit;
a warning sound generating unit to generate a warning sound in response to detection of the occurrence of the emergency by said detecting unit;
a vibration generating unit to generate vibration; and
an outgoing-call answering notification unit to activate said vibration generating unit in the case where an answer to the call originated by said interlock calling unit is detected in an emergency mode.

13. The mobile information terminal according to claim 12, further comprising:
an incoming call detecting unit to detect an incoming call; and
an answering unit to answer the incoming call detected by said incoming call detecting unit in an emergency mode in the case where the incoming call is associated with said telephone number prestored in said storage unit.

14. The mobile information terminal according to claim 13, further comprising:
a warning sound generating unit to generate a warning sound in response to detection of the occurrence of the emergency by said detecting unit;
a vibration generating unit to generate vibration; and
an incoming-call answering notification unit to activate said vibration generating unit when said answering unit answers in the emergency mode.

15. The mobile information terminal according to claim 12, wherein
said storage unit is capable of storing a plurality of said telephone numbers,
said interlock calling unit includes a selecting unit to select said plurality of telephone numbers, and
said selecting unit selects a next telephone number in the case where an answer to a call originated to a previously selected telephone number is not detected within a predetermined period of time after the origination of the call.

16. A mobile information terminal comprising:
a detecting unit to detect an occurrence of an emergency;
a mode switching unit to switch a mode to an emergency mode in response to detection of the occurrence of the emergency by said detecting unit;
a warning sound generating unit to generate a warning sound in response to detection of the occurrence of the emergency by said detecting unit; and
a sensitivity lowering unit to reduce to greater than zero a volume of sound collected by a microphone by lowering sensitivity of the microphone for use in telephone conversation during at least a part of a telephone conversation in said emergency mode.

17. The mobile information terminal according to claim 16, wherein said sensitivity lowering unit lowers the sensitivity of the microphone while said warning sound generating unit is generating the warning sound.

18. The mobile information terminal according to claim 16, wherein said warning sound generating unit includes a stop unit to temporarily stop generation of the warning sound, and a step-up output unit to increase a volume in a stepwise manner over time in the case where the temporary stop by said stop unit is released while the telephone conversation is continued.

19. The mobile information terminal according to claim 16, further comprising:

a storage unit to store a telephone number in advance; and an interlock calling unit to call the telephone number prestored in said storage unit in said emergency mode.

20. The mobile information terminal according to claim 19, further comprising a reproduction unit to reproduce a predetermined message in response to detection of an answer to the call originated by said interlock calling unit, wherein said sensitivity lowering unit includes a cut-off unit to cut off an output of said microphone during the time when said reproduction unit is reproducing the message.

21. The mobile information terminal according to claim 16, further comprising:

a storage unit to store a telephone number in advance;

an incoming call detecting unit to detect an incoming call; and an answering unit to answer the incoming call detected in said emergency mode in the case where said incoming call is associated with the telephone number prestored in said storage unit.

22. The mobile information terminal according to claim 1, wherein said control unit further includes an emergency mode release unit to delete said mode information indicating the emergency mode from said storage unit in response to completion of said predetermined processing.

23. The mobile information terminal according to claim 1, wherein said emergency processing executing unit includes a calling unit to call a predetermined destination.

24. The mobile information terminal according to claim 6, further comprising a calling unit to call the predetermined destination.

* * * * *